United States Patent [19]
Yu

[11] Patent Number: 6,028,648
[45] Date of Patent: Feb. 22, 2000

[54] PICTURE SYNCHRONIZATION CIRCUIT AND METHOD THEREFOR

[75] Inventor: Pil-ho Yu, Suwon, Rep. of Korea

[73] Assignee: Samsung Electronics Co., Ltd., Kyungki-Do, Rep. of Korea

[21] Appl. No.: 08/924,821

[22] Filed: Sep. 5, 1997

[30]     Foreign Application Priority Data

Sep. 5, 1996 [KR] Rep. of Korea ..................... 96-38453

[51] Int. Cl.[7] ................................................ H04N 9/475
[52] U.S. Cl. ......................... 348/845.3; 348/845; 348/512
[58] Field of Search ................................. 248/845.3, 500, 248/512, 518, 536; 375/354; 348/845; H04N 9/475

[56]     References Cited

U.S. PATENT DOCUMENTS

| | | | |
|---|---|---|---|
| 5,771,075 | 6/1998 | Rim et al. | 348/512 |
| 5,802,239 | 9/1998 | Fujinami | 386/47 |
| 5,808,722 | 9/1998 | Suzuki | 348/515 |
| 5,815,634 | 9/1998 | Daum et al. | 348/515 |

*Primary Examiner*—Michael H. Lee
*Attorney, Agent, or Firm*—Sughrue, Mion, Zinn, Macpeak & Seas, PLLC

[57]     ABSTRACT

In a picture synchronization circuit, a decoding time stamp value of an input picture is compared with a system time clock count value at the moment a picture is input. When the decoding time stamp value is larger than the system time clock count value, and when a difference between the decoding time stamp value and the system time clock count value is larger than a predetermined threshold value, decoding of the input picture is delayed by an amount of time corresponding to the difference. When the decoding time stamp value is smaller than the system time clock count value, and when the difference between the decoding time stamp value and the system time clock count value is larger than a predetermined threshold value, the input picture is skipped without decoding. Therefore, the correct time of output of the decoded picture is restored.

24 Claims, 9 Drawing Sheets

FIG. 7A sclk
FIG. 7B clk_90KHz
FIG. 7C pulse_90KHz
FIG. 8A sclk
FIG. 8B pulse_pic_nd
FIG. 8C pulse_hold_start
FIG. 8D hold_vld
FIG. 8E pulse_90KHz
FIG. 8F down_cnt

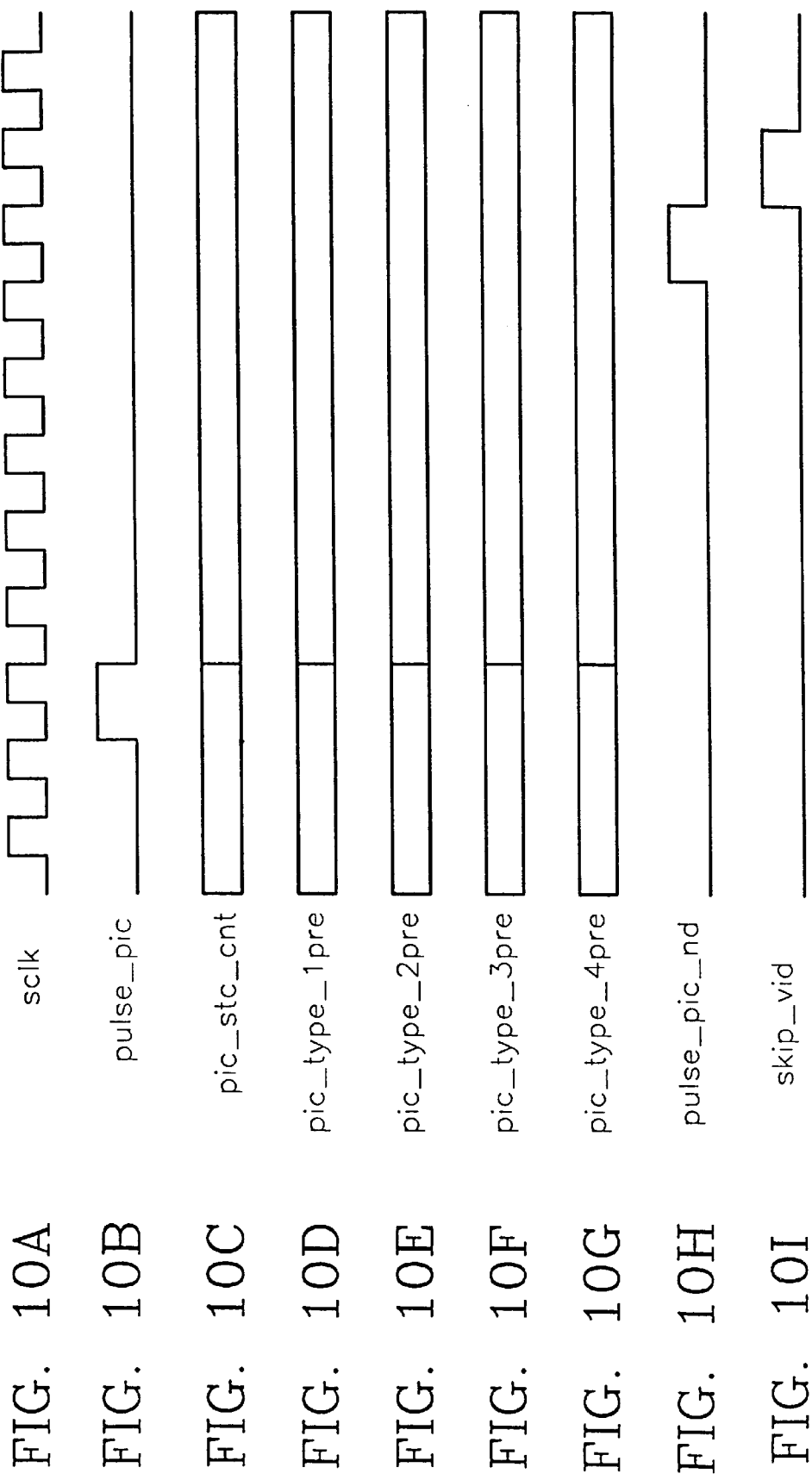

PICTURE SYNCHRONIZATION CIRCUIT AND METHOD THEREFOR

BACKGROUND OF THE INVENTION

1. Field of the Invention

The present invention relates to picture synchronization circuit and method for a moving picture decoder, and more particularly, to picture synchronization circuit and method wherein decoding is delayed or a current picture is skipped without decoding by comparing a decoding time stamp value of a picture with a count value of a system time clock at the moment of picture input, thereby restoring the decoding time of the picture. The present invention is based on Korean Application No. 96-38453, which is incorporated herein by reference.

2. Description of the Prior Art

Digital video technology is applicable not only to communication fields such as video teleconference and video telephone, but also to various applied fields such as the computer and home appliance products. For the purpose of technical cooperation between different applied fields, the Internal Organization for Standardization (ISO) has started developing a standard of videos for digital storage media and associated audio. Such an effort for standardization has brought about the motion picture experts group (MPEG).

MPEG standardization relates to a picture, sound and a system. The picture denotes coding of moving picture information, the sound denotes coding of sound information, and the system denotes coding of multi-information where sound is combined with a picture. Accordingly, the picture, the sound and the system are called MPEG-video, MPEG-audio and MPEG-system, respectively. As for coding of the moving picture information, an MPEG-2 picture decoder for decoding coded moving picture data is shown in FIG. 1.

Referring to FIG. 1, a buffer 10 temporarily stores received coded data. A demultiplexer & variable-length decoder (hereinafter, called "a variable-length decoder") 12 variable-length decodes coded data output by the buffer 10, and outputs the variable-length decoded data and quantized stepsize (QP) to an inverse-quantizer 14, outputs a macroblock-type control signal (MB type) and a motion vector (MV) to an adaptive predictor 22, and outputs a DCT mode control signal (DCT mode) to an IDCT (inverse discrete cosine transform) processor 16. Additionally, types of pictures input to the encoder are I, P and B.

The received coded data is a moving picture signal which has an MPEG-2 structure and is interframe-coded between pictures. Here, according to the interframe coding, other pictures, except for intrapictures within a 1 GOP unit, are coded with only the difference between adjacent pictures. The 1 GOP has intrapicture (I) data, capable of being independently coded without other picture data; predicted picture (P) data, which is obtained from preceding intrapicture data or predicted picture data and can be coded using compensation of the motion between adjacent pictures; and interactive predicted picture (B) data, which is obtained from the preceding intrapicture data or predicted picture data and from the following intrapicture data or predicted picture data, and can be coded by the motion compensation.

The inverse-quantizer 14 inverse-quantizes the variable-length decoded data, using the quantization stepsize (QP) used during decoding. The IDCT processor 16 inverse-DCT processes the inverse-quantized data according to a DCT mode control signal (DCT mode), and outputs the result to the first input of an adder 18. That is, the IDCT processor 16 performs inverse-DCT conversion with respect to the original picture in the case of an I-picture, and performs inverse-DCT conversion with respect to the difference component in the case of a P- or B-picture.

The output of the adder 18 is stored in a field/frame memory 20 and then output. The MPEG-2 moving picture decoder can support both field mode and frame mode as a screen processing mode, and requires the field/frame memory 20 to use the field mode when pictures contain much motion and to use the frame mode when pictures contain little motion.

Meanwhile, the adaptive predictor 22 predicts data, using data stored in the field/frame memory 20, according to the macroblock type control signal (MB type) and the motion vector which are output by the variable-length decoder 12, and outputs the result to the second input of the adder 18.

Here, the macroblock type usually uses a 4:2:0 format. Since a picture has a structure in which a field coexists with a frame, the MV obtained from each field is independently applied depending on each field, in a field structure, and is applied regardless of fields, in a frame structure.

The adaptive predictor 22 is employed when the received picture is a P- or B-picture. That is, the adaptive predictor 22 outputs a motion compensation prediction signal to the adder 18 on the basis of the previous I- and P-pictures, in the case of the P-picture, and generates a motion compensation prediction signal and a motion compensation interpolated signal on the basis of the previous and next I- and P-pictures, in the case of the B-picture. At this time, the best signal of the generated prediction signals is selected and applied to the adder 18.

Thus, the adder 18 outputs data output by the IDCT processor 16 to the field/frame memory 20 in the case of the I-picture, and adds the output of the IDCT processor 16 to the output of the adaptive predictor 22 and outputs the result to the field/frame memory 20 in the case of a P- or B-picture.

Meanwhile, coded moving picture data includes a program clock reference (hereinafter, called "PCR") for synchronization of the encoder with the corresponding decoder, a presentation time stamp (PTS) and a decoding time stamp (DTS).

Here, the PCR has 42 bits, and is used as the reference for a phase locked loop (PLL) circuit for restoring a 27 MHz system time clock (STC) of the encoder. Also, the PCR is made up of PCR_base 33 bits and PCR_ext 9 bits. Here, the PCR base represents time in 90KHz units, being 1/300 of 27 MHz, and is expressed as follows:

$$PCR = PCR\_base \times 300 + PCR\_ext \qquad (1).$$

The PTS is made up of 33 bits, and represents time in 90 KHz units, representing the start of picture display. The DTS is made up of 33 bits, and represents time in 90 KHz units, representing the start of picture encoding.

The PTS and DTS are not present in every picture. That is, there are cases when both of the PTS and DTS do not exist in each picture, or when only the PTS exists. For example, there is a case when the PTS and DTS are identical, as in the B-picture. Accordingly, when a picture does not have both of the PTS and DTS, the encoder makes the DTS of the current picture from the DTS of the previous picture. For example, when the frame rate is 60 Hz, "1500" is added to the DTS of the previous picture, and the resultant sum is set as the DTS of the current picture. Also, when a picture has only the PTS, the PTS is used as the DTS.

Meanwhile, if the DTS of a picture is larger than the count value of a system time clock at the moment of starting picture decoding on the basis of an up-counted value by a 90 KHz clock obtained by dividing 27 MHz STC by 300, the picture will be decoded earlier than expected. On the other hand, if the DTS of a picture is smaller than the count value of the system time clock, the picture will be decoded later than expected.

Therefore, when the picture is decoded earlier than expected, the buffer 10 of FIG. 1 underflows, and when the picture is decoded later than expected, the buffer 10 overflows. Thus, a normal decoding process is not carried out.

SUMMARY OF THE INVENTION

To solve the above problems, it is an object of the present invention to provide, in a moving picture decoder, a picture synchronization circuit whereby decoding of a current picture is delayed or the current picture is skipped without decoding. Whether decoding the current picture is delayed or the picture is skipped without decoding is determined according to comparison results of a decoding time stamp (DTS) value of an input picture with a system time clock (STC) count value at the moment of picture input, thereby restoring the decoding time of the picture.

It is another object of the present invention to provide a picture synchronization method whereby decoding of a current picture is delayed or the current picture is skipped without decoding, according to comparison results of a decoding time stamp (DTS) value of an input picture with a system time clock (STC) count value at the moment of picture input, thereby restoring the decoding time of the picture.

To accomplish the first object, there is provided a picture synchronization circuit in a moving picture decoder for decoding an input picture, comprising: first generating means for comparing a decoding time stamp (dts) value of an input picture with a system time clock (STC) count value at the moment of inputting a picture, and generating a comparison signal; second generating means for generating a first control signal for delaying decoding of the input picture, according to the comparison signal; and third generating means for generating a second control signal for skipping the input picture without decoding, according to the comparison signal.

To accomplish the second object, there is provided a picture synchronization method in a method for decoding an input coded moving picture, the method comprising the steps of: (a) comparing a decoding time stamp value of an input picture with a system time clock count value at the moment when a picture is input; and (b) delaying decoding of an input picture by the time corresponding to a difference between the decoding time stamp value and the system time clock count value, when the decoding time stamp value is larger than a system time clock count value, and when the difference therebetween is larger than a predetermined threshold value in the comparison result in the step (a), and skipping the input picture without decoding when the decoding time stamp value is smaller than a system time clock count value, and when the difference between the decoding time stamp value and the system time clock count value is larger than a predetermined threshold value.

BRIEF DESCRIPTION OF THE DRAWINGS

The above objects and advantages of the present invention will become more apparent by describing in detail a preferred embodiment thereof with reference to the attached drawings in which:

FIGS. 7A–C and 8A–F are timing charts of the input and output signals of the hold determination circuit shown in FIG. 6;

FIGS. 10A–I are timing charts of the input and output signals of the skip determination circuit shown in FIG. 9.

DETAILED DESCRIPTION OF THE INVENTION

Figure 1:
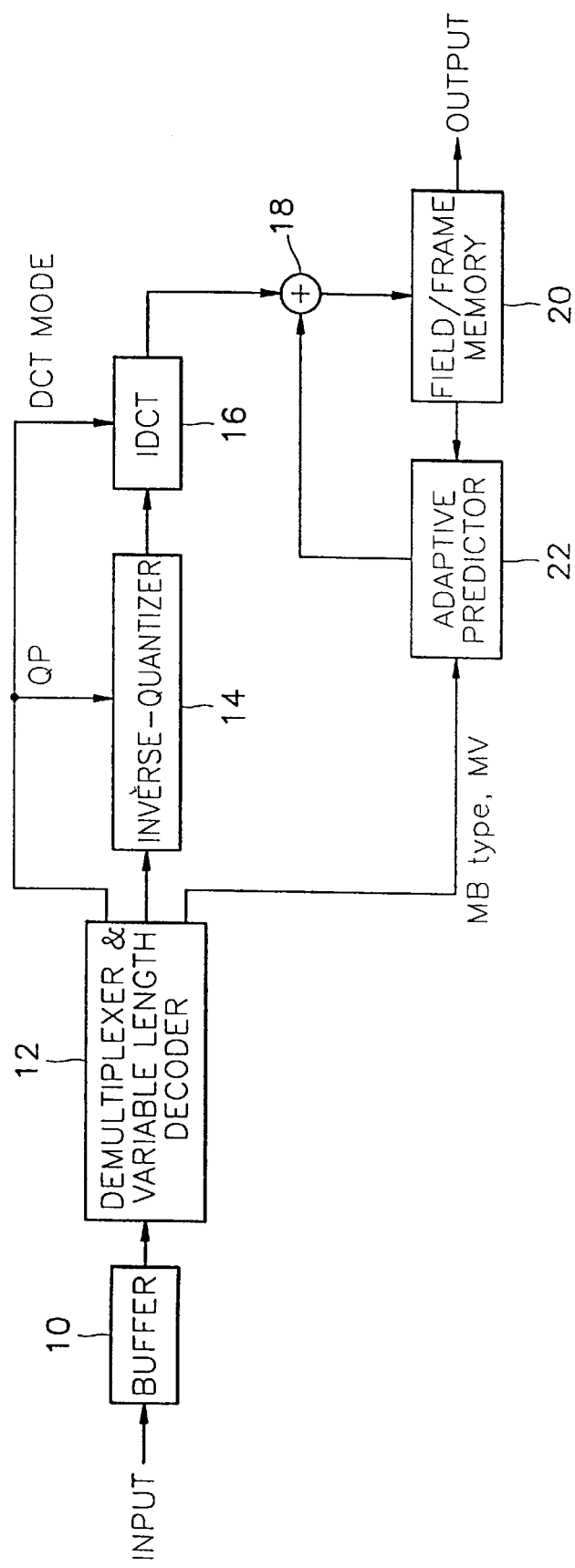
FIG. 1 is a block diagram of a general moving picture decoder.
Figure 2:
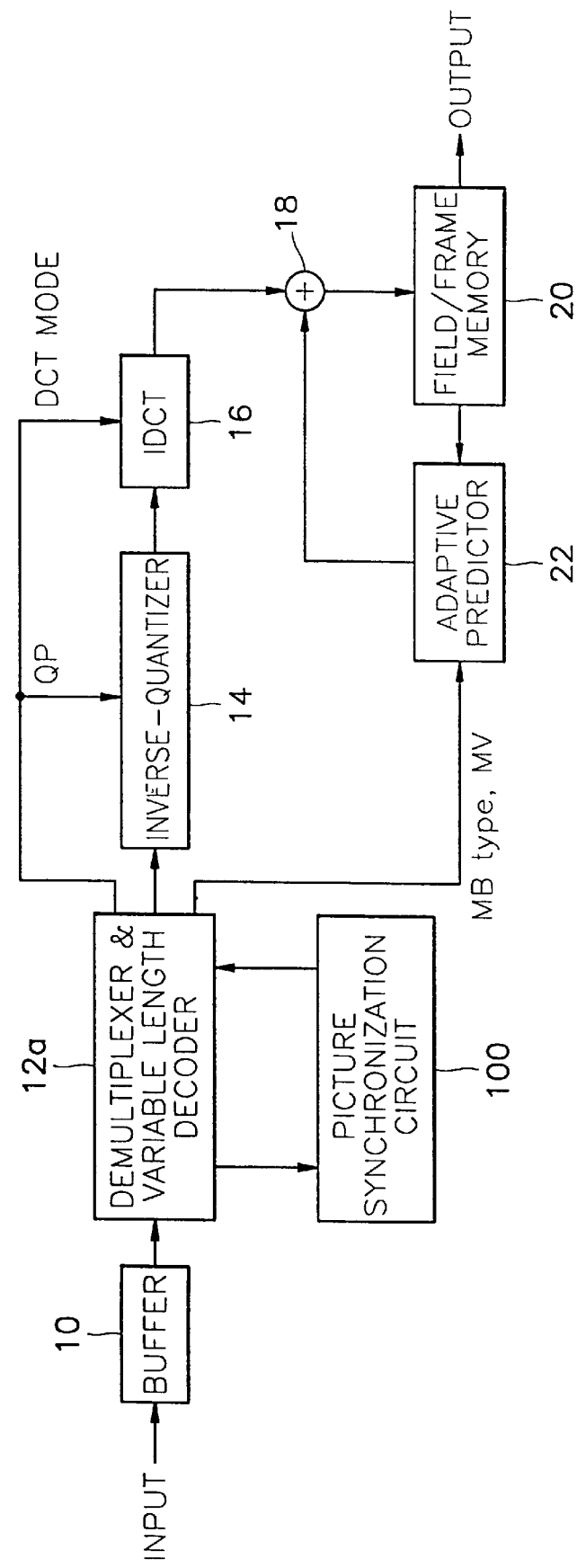
FIG. 2 is a block diagram of a moving picture decoder to which a picture synchronization circuit according to the present invention is applied.

FIG. 2 illustrates a moving picture decoder to which a picture synchronization circuit of the present invention is applied. The same reference numerals are given to the same members as those of FIG. 1, and a detailed description thereof will be omitted.

Referring to FIG. 2, a picture synchronization circuit 100 receives a plurality of control signals from a variable-length decoder 12a, and outputs a hold command, to stand-by without decoding, or a skip command to abandon a current picture without decoding, to the variable-length decoder 12a, according to the comparison results of a DTS value of a picture with an STC count value at the moment a picture is input. Such a comparison is performed whenever a picture is input to a moving picture decoder.

Figure 3:
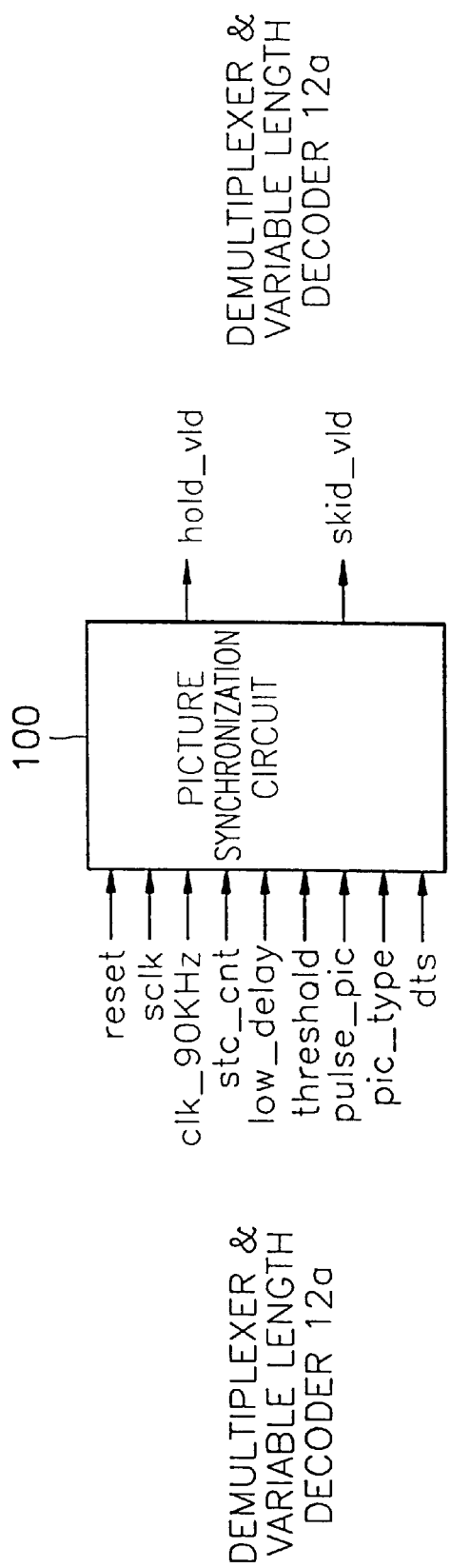
FIG. 3 is a view for explaining input and output signals of the picture synchronization circuit according to the present invention.

FIG. 3 shows the input and output signals of the picture synchronization circuit according to the present invention. Referring to FIG. 3, the picture synchronization circuit 100 receives a reset signal, an sclk, a clk__90KHz, an stc__cnt, a low-delay signal, a threshold value, a pulse-pic signal, a pic__type signal, and a dts, all of which are output by the variable-length decoder 12a of FIG. 2. Here, the reset signal is an initialization signal, the sclk is a system clock, and the clk__90KHz is a clock having a 90 KHz frequency. The stc__cnt is an STC count value (which is made up of 33 bits) incremented according to clk__90KHz, and is a basis of determining whether the picture input time is early or late, by comparison with the DTS value of a picture whenever the picture is input.

The low__delay is a B-picture detection signal representing whether a B-picture is included in input data. The threshold value, as an arbitrary constant, is a limit value representing a hold or skip allowable range. The pulse__pic is a signal which becomes "high" for one clock cycle of the system clock (sclk) when header information (picture__type, pic__structure, etc.) of one picture are all decoded by the variable-length decoder 12a. Hereinafter, the pulse__pic is referred to as a picture start signal. The pic__type is a current picture type signal representing current picture types ("00"= I, "10"=P and "11"=B). The dts is a decoding time stamp value made up of 33 bits (90 KHz unit), and denotes the picture decoding start time.

A hold_vld output by the picture synchronization circuit 100 is a hold command (indicating "standby" when high, and "decode" when low) ordering the variable-length decoder 12a to stand by. The skip_vld is a skip command (indicating "abandon" when high, and "decode" when low) ordering the variable-length decoder 12a to abandon a current picture without decoding.

Accordingly, when the DTS value of a picture is larger than an STC count value at the moment decoding starts (pic_stc_cnt), the picture synchronization circuit 100 must delay decoding of the picture until the STC count value (stc_cnt) becomes identical to the DTS value. When the DTS value of a picture is smaller than an STC count value at the moment decoding starts (pic_stc_cnt), the picture synchronization circuit 100 should reduce errors of the DTS value and the STC count value (stc_cnt) from the next picture, even though the current picture must be abandoned.

However, the DTS value and the STC count value at the moment decoding starts (pic_stc_cnt) are usually not identical. Thus, the delay or the abandonment should be performed only when the error is greater than a predetermined threshold value in order to allow for a certain amount of error.

Here, the B-picture may be abandoned, but the P-picture, and particularly the I-picture, must not be abandoned because they affect decoding of the next pictures. However, although the B-picture detection signal (low_delay) is "0" when no B-picture is included, even the P-picture should be abandoned. The case when the low_delay is "1" denotes that no B-picture is included in input data.

Also, when the B-picture detection signal (low_delay) is "1", all but the I-picture may be abandoned. However, when previous pictures were all I-pictures, then even though a current picture is an I-picture, the I-picture may be abandoned. A current picture type signal (pic_type) is made up of 3 bits ("001"=I, "010"=P and "011"=B), but the present invention uses only the lower 2 bits ("01"=I, "10"=P and "11"=B).

Figure 4:
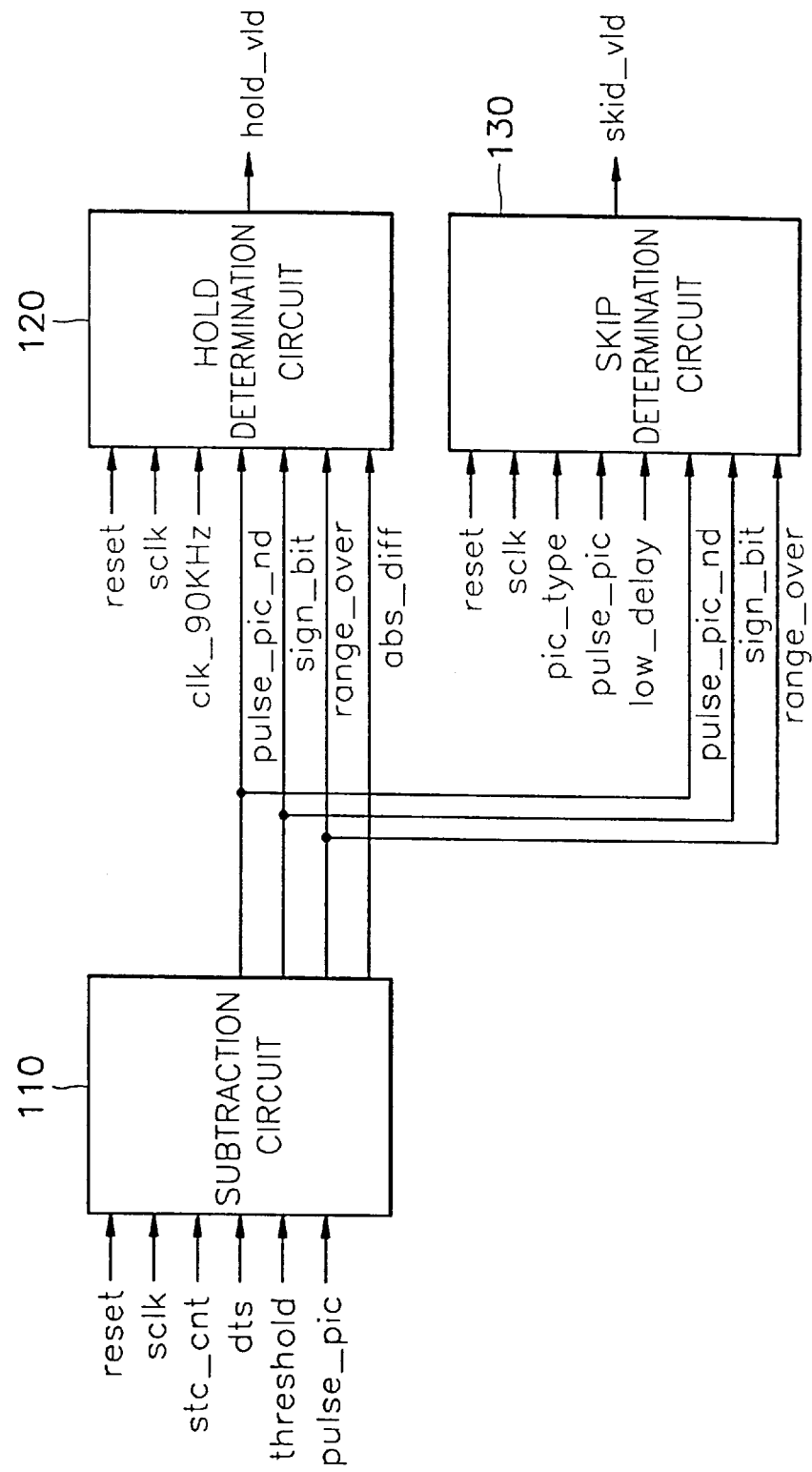
FIG. 4 is a block diagram of a picture synchronization circuit according to a first embodiment of the present invention.

FIG. 4 is a block diagram of a picture synchronization circuit according to a first embodiment of the present invention. The picture synchronization circuit is roughly divided into a subtraction circuit 110, a hold determination circuit 120 and a skip determination circuit 130. A detailed description of each configuration will be given with reference to FIGS. 5 through 10I.

Figure 5:
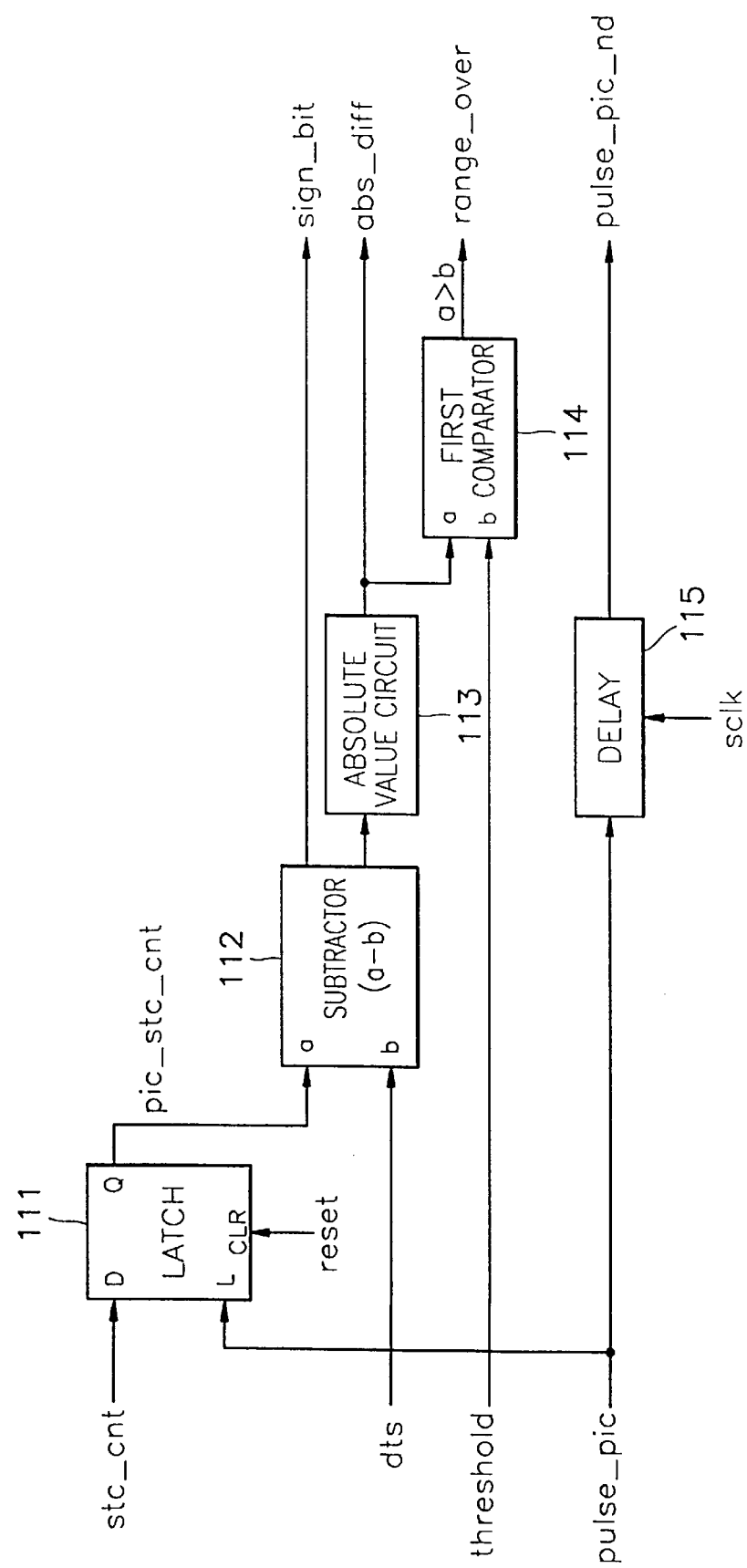
FIG. 5 is a detailed circuit diagram of the subtraction circuit shown in FIG. 4.

FIG. 5 is a detailed circuit diagram of the subtraction circuit shown in FIG. 4. Here, the subtraction circuit 110 includes a latch 111 for latching an STC count value at the moment a picture starts being decoded (pic_stc_cnt), a subtractor 112 for subtracting a decoding time stamp (dts) value from the output of the latch 111, an absolute value circuit 113 for calculating the absolute value (abs_diff) of the subtraction result, a first comparator 114 for comparing the absolute value (abs_diff) with a threshold value, and a delay 115 for delaying a picture starting signal (pulse_pic) by the delayed time until a comparison range (range_over) signal is output by the first comparator 114.

Next, an operation of the subtraction circuit 110 shown in FIG. 5 will be described.

Referring to FIG. 5, in the first latch 111, the picture starting signal (pulse_pic), indicating the start of a picture is input to a load input (L), the STC count value (stc_cnt) is input to a data input(D), and the initialization signal (reset) is input to a clear input (CLR). Here, the first latch 111, having the load input (L), the data input(D) and the clear input (CLR), latches the STC count value (stc_cnt) when the pulse pic is "1" and outputs the STC count value at the moment decoding starts (pic_stc_cnt). That is, the pic_stc_cnt is the STC count value (stc_cnt) latched when the picture starting signal (pulse_pic) is "high".

The subtractor 112 subtracts the decoding time stamp (dts) value from the STC count value at the moment decoding starts (pic_stc_cnt), which is latched by the latch 111. When the subtraction results in a positive value, a situation where the picture will be decoded later than expected is indicated. Thus, a sign bit (sign_bit) is output as "0". On the other hand, when the subtraction results in a negative value, a situation where the picture will be decoded earlier than expected is indicated. Thus, the sign bit (sign_bit) is output as "1".

The absolute value circuit 113 obtains the absolute value (abs_diff) of the result of the subtraction made by the subtractor 112. The first comparator 114 compares the absolute value (abs_diff) with a threshold value, and outputs a comparison range (range_over) as "1" when the absolute value (abs_diff) is larger than the threshold value, and otherwise, outputs the comparison range (range_over) as "0". Here, range_over is a signal representing whether the absolute value (abs_diff) of the result of the subtraction of the decoding time stamp (dts) value from the STC count value (stc_cnt) is larger than the threshold value. That is, "1" represents that the absolute value (abs_diff) is larger than the threshold value, and "0" represents that the absolute value (abs_diff) is smaller than or equal to the threshold value.

Also, the delay 115 outputs a picture delay signal (pulse_pic_nd) by which the picture starting signal (pulse_pic) is delayed by the time (n clock cycles) until the comparison range (range_over) is determined. Here, the picture delay signal (pulse_pic_nd) is a signal by which the picture starting signal (pulse_pic) is delayed by at least the time required for the result of the subtraction of the decoding time stamp (dts) value from the STC count value (stc_cnt) to be output.

Accordingly, when the sign bit (sign_bit) is "1" and the comparison range (range_over) is "1", a situation where an input picture is to be decoded earlier than expected is indicated. Thus, the hold determination circuit 120 shown in FIG. 6 is operated because decoding of the picture must be delayed until the STC count value (stc_cnt) of the picture and the decoding time stamp (dts) values become identical.

Figure 9:
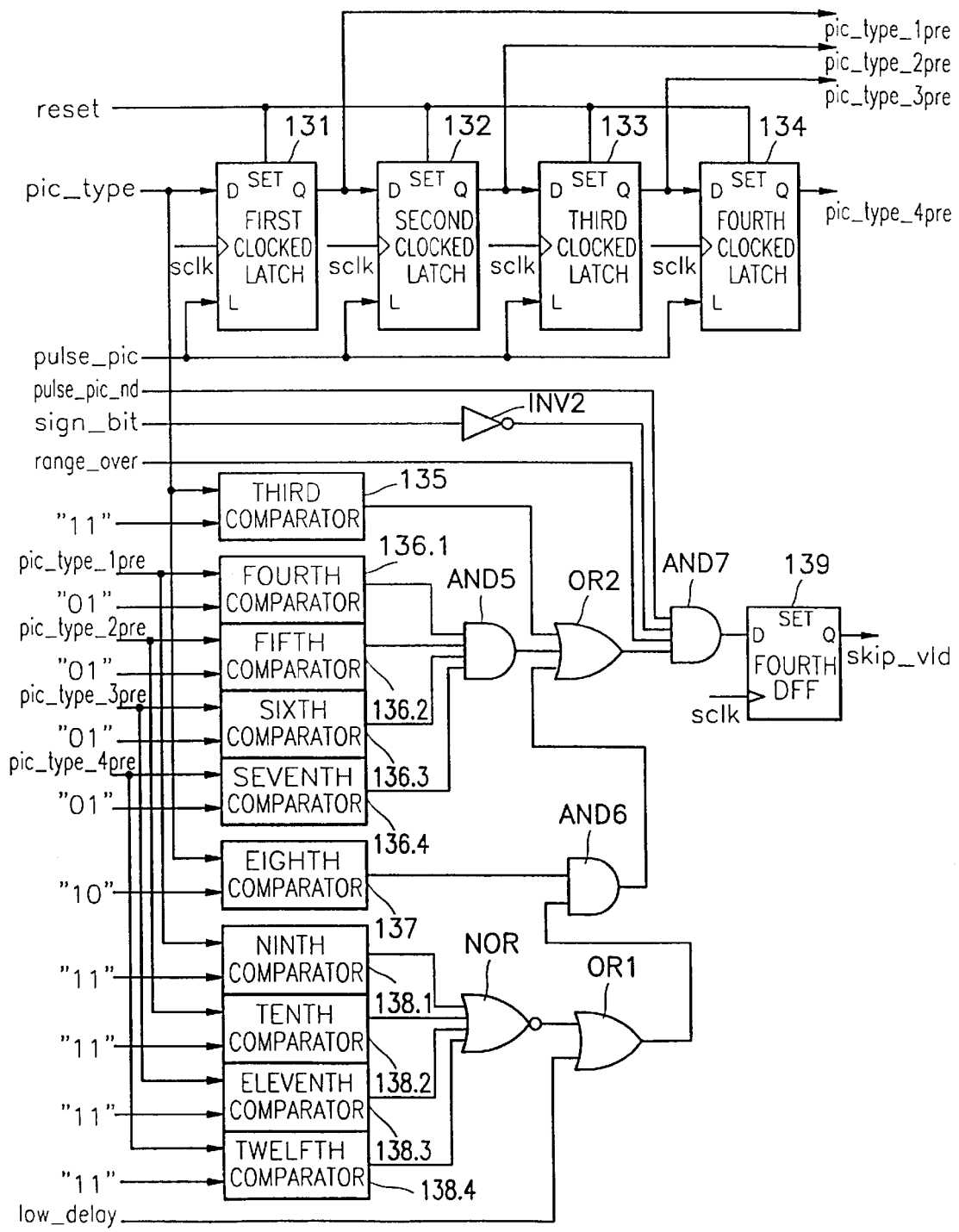
FIG. 9 is a detailed circuit diagram of the skip determination circuit shown in FIG. 4.

When the sign bit (sign_bit) is "0" and the comparison range (range_over) is "1", a situation where an input picture is to be decoded later than expected is indicated. Thus, the skip determination circuit 130 shown in FIG. 9 is operated in order to reduce an error between the STC count value (stc_cnt) of a picture and the decoding time stamp (dts) value, even by abandoning the input picture.

When the comparison range (range_over) is "0" and the sign bit (sign_bit) is "1" or "0", the hold determination circuit 120 and the skip determination circuit 130 output a hold command (hold_vld) and a skip command (skip_vld), respectively, as "0". Thus, the variable-length decoder 12a performs a normal decoding.

Figure 6:
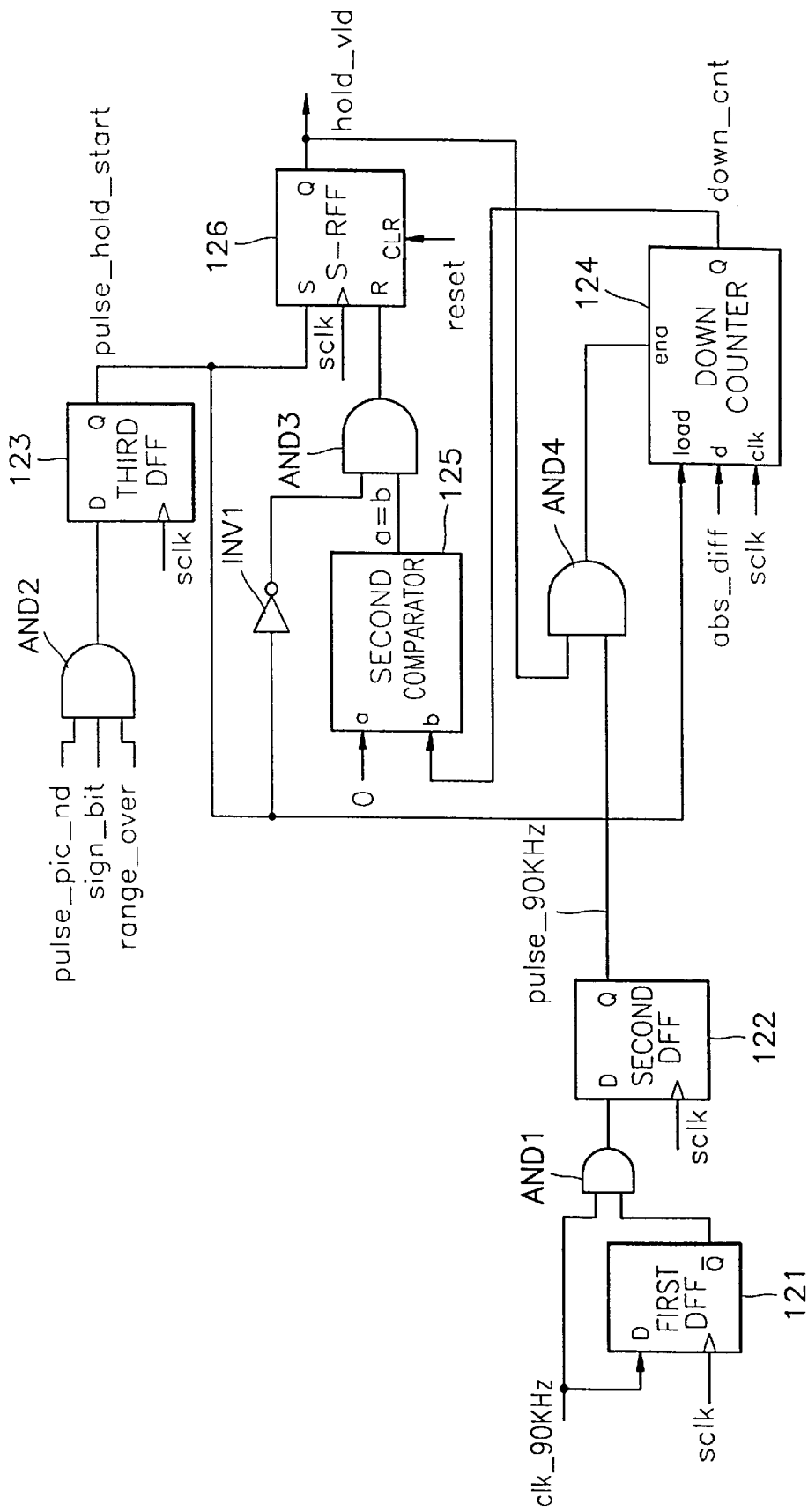
FIG. 6 is a detailed circuit diagram of the hold determination circuit shown in FIG. 4.

FIG. 6 is a detailed circuit diagram of the hold determination circuit shown in FIG. 4. The hold determination circuit 120 includes detecting circuits 121, AND1 and 122 for detecting a rising edge of a 90 KHz clock signal (clk_90KHz); generating circuits AND2 and 123 for generating a hold start signal (pulse_hold_start) indicating the start of holding according to the picture delay signal (pulse_pic_nd), the sign bit (sign_bit) and the comparison range (range_over); counting circuits AND4 and 124 for loading a difference value (abs_diff) between the decoding time stamp (dts) value and the STC count value (stc_cnt), and for reducing the difference value by one at every rising edge of the 90 KHz clock signal (clk_90KHz); and circuits INV1, 125, AND3 and 126 for generating a hold command (hold_vld) ordering delay of decoding.

Now, the operation of the hold determination circuit 120 shown in FIG. 6 will be described referring to FIGS. 7A–7C and FIGS. 8A–8F.

A first D flip-flop (DFF) 121 delays the 90 KHz clock signal (clk_90KHz) shown in FIG. 7B by one clock pulse according to the system clock (sclk) of FIG. 7A. The first AND gate (AND1) performs an AND operation on the inverted output of the first DFF 121 and the 90 KHz clock signal (clk_90KHz), and inputs the result to the second DFF 122. Then, the second DFF 122 outputs a pulse signal (pulse_90KHz), shown in FIG. 7C, indicating a rising edge of the 90 KHz clock signal (clk_90KHz) according to the system clock (sclk).

Meanwhile, when a picture delay signal (pulse_pic_nd) (as shown in FIG. 8B, output by the delay 115 of FIG. 5 according to the system clock (sclk) shown in FIG. 8A) is "1", the comparison range (range_over) (output by the first comparator 114 of FIG. 5) is "1", and the sign bit (sign_bit) (output by the subtractor 112 of FIG. 5) is also "1", the second AND gate (AND2) outputs "1".

The third DFF 123, receiving the output "1" of the second AND gate (AND2), outputs "1" as a hold start signal (pulse_hold_start) indicating the start of delay of decoding by the variable-length decoder 12a shown in FIG. 2. At this time, the waveform of the hold start signal (pulse_hold_start) is shown in FIG. 8C.

When the hold start signal (pulse_hold_start), indicating the start of decoding delay, output by the third DFF 123, is "1", an S-R flip-flop (S-RFF) 126 is set to "1". Here, the output of the S-RFF 126 is a hold command (hold_vld) for controlling the decoding standby of the variable-length decoder 12a. Accordingly, while the hold command (hold_vld) of FIG. 8D is "1", the variable-length decoder 12a stands by without decoding.

Meanwhile, when the picture delay signal (pulse_pic_nd) is "1", a down counter 124 receives the absolute value (abs_diff) (output by the absolute value circuit 113 of FIG. 5) through a data input (d), receives the hold start signal (pulse_hold_start) (output by the third DFF 123) through a load input (load), receives the output of the fourth AND gate (AND4) (for performing an AND operation on the hold command (hold_vld) output by the S-RFF 126 and the pulse signal (pulse_90KHz), shown in FIG. 8E and output by the second DFF 122) through an enable input (ena), and receives the system clock (sclk) through a clock input (clk). Thus, the fourth AND gate (AND4) outputs "1" whenever the pulse signal (pulse_90KHz) is "1" and the hold command (hold_vld) is "1", and enables the down counter 124 to reduce the input absolute value (abs_diff) by one. The output of the down counter 124 is shown in FIG. 8F.

When the output of the down counter 124 is "0", the output of the second comparator 125 becomes "1", which is input to an input of the third AND gate (AND3). Also, the hold start signal (pulse_hold_start), output by the third DFF 123, is inverted by an inverter (INV1) and input to the other input of the third AND gate (AND3). Accordingly, the output "1" of the third AND gate (AND3) resets the S-RFF 126 so that the hold command (hold_vld) becomes "0".

Meanwhile, when the picture delay signal (pulse_pic_nd) is "1", the comparison range (range-over) is "1" and the sign bit (sign_bit) is "0", the output of the second AND gate (AND2) becomes "0". Thus, the hold command (hold_vld) output by the S-RFF 126 becomes "0" and the current picture is not held. Instead, the skip determination circuit 130 shown in FIG. 9 operates.

FIG. 9 is a detailed circuit diagram of the skip determination circuit shown in FIG. 4. The skip determination circuit 130 includes latches 131–134, for latching the picture type values of previous pictures; circuits 135–138.4, AND5, AND6, NOR, OR1 and OR2, for comparing the type of the current picture with the types of the previous pictures, and generating a control signal for controlling the skip of a current picture according to comparison conditions; circuits INV2, AND7 and 139, for issuing a skip command ordering the variable-length decoder 12a to abandon a picture without decoding, according to the control signal, the picture delay signal (pulse_pic_nd), the sign bit (sign_bit) and the comparison range (range_over).

The operation of the skip determination circuit 130 shown in FIG. 9 will be described with reference to FIG. 9 and FIGS. 10A–10I.

The first to fourth clocked latches 131–134, respectively, are connected to each other in series. The system clock (sclk) shown in FIG. 10A is input to a clock input of each latch 131–134. The picture start signal (pulse_pic) shown in FIG. 10B is input to a load input (L) of each latch 131–134. A current picture type signal (pic_type) is input to a data input (D) of the first clocked latch 131.

The first to fourth clocked latches 131–134, respectively, respectively, output one picture-previous type signal through four pictures-previous type signal (pic_type_1pre through pic_type_4pre), respectively, through their outputs (Q). The first reason for generating the one picture-previous to four pictures-previous type signals is to correspond to a field mode where one picture is made up of two fields. The second reason is to prevent the possibility of abandoning a P-picture although the B-picture exists in the initial GOP. This is necessary because the sequence of an initial GOP (in the case that it is made up of 15 pictures) of a program input to a moving picture decoder is "IPBBPBBPBBPBBPB", but the sequences of next GOPs are all "IBBPBBPBBPBBPBB".

Here, FIG. 10C shows an STC count value at the moment of starting a picture (pic_type_cnt), FIG. 10D shows a one picture-previous type signal (pic_type_1pre), FIG. 10E shows a two pictures-previous type signal (pic_type_2pre), FIG. 10F shows a three pictures-previous type signal (pic_type_3pre), and FIG. 10G shows a four pictures-previous type signal (pic_type_4pre).

The picture delay signal (pulse_pic_nd), shown in FIG. 10H, output by the delay 115 of FIG. 5, is input as "1" to a first input of a seventh AND gate (AND7). The comparison range (range_over), output by the first comparator 114 of FIG. 5, is input as "1" to a second input of the seventh AND gate (AND7). The sign bit (sign_bit) "0" output by the subtractor 112 of FIG. 5 is inverted by the second inverter (INV2) and input as "1" to a third input of the seventh AND gate (AND7). The output of the second OR gate (OR2), being the comparison result of the type of the current picture with the types of previous pictures, must be input as "1" to a fourth input of the seventh AND gate (AND7) to make the output of the seventh AND gate (AND7) become "1". Thus, the skip command (skip_vld), shown in FIG. 10I, output by the fourth DFF 139 also becomes "1". When the skip command (skip_vld) is "1", the variable-length decoder 12a shown in FIG. 2 abandons the current picture without decoding.

When the picture delay signal (pulse_pic_nd) is "1", the sign bit (sign_bit) is "0" and the comparison signal range (range_over) is "1", the fourth DFF 139 generates a skip command according to the output of the second OR gate (OR2). Accordingly, conditions for comparison of a current picture with previous pictures will now be described.

The third comparator 135 compares a current picture type signal (pic_type) with the value "1" indicating a B-picture. When the current picture type is a B-picture, the comparison result "1" is input to the first input port of the second OR gate (OR2), and the output of the seventh AND gate (AND7) also becomes "1". Thus, the fourth DFF 139 generates the skip command (skip_vld).

The fourth to seventh comparators 136.1–136.4, respectively, compare one picture-previous through four pictures-previous type signals, respectively, with the value "01" indicating an I-picture. When the one picture-previous to four pictures-previous type signals all indicate an I-picture, the output of the fifth AND gate (AND5) becomes "1", and so the output of the seventh AND gate (AND7) also becomes "1". Thus, the fourth DFF 139 generates the skip command (skip_vld). That is, if the four previous pictures were all I-pictures, then even if the current picture is an I-picture, the skip command, ordering to abandon the current picture without decoding, is generated.

The eighth comparator 137 compares a current picture type signal (pic_type) with the value "10" indicating a P-picture, and inputs the result to the first input of the sixth AND gate (AND6).

The ninth to twelfth comparators 138.1–138.4, respectively, compare the one picture-previous to four pictures-previous type signals (pic_type_1pre) to (pic_type_4pre), respectively, with the value "11" indicating a B-picture, and input the results to a NOR gate (NOR).

The first OR gate (OR1) performs an OR operation on the output of the NOR gate (NOR) and a B-picture detection signal (low_delay), and inputs the results to the second input of the sixth AND gate (AND6). That is, when the current picture is a P-picture, and when the B-picture detection signal (low_delay), indicating that no B-picture is included in input data, is "1", the output of the sixth AND gate (AND6) becomes "1", and so the output of the seventh AND gate (AND7) also becomes "1". Thus, the fourth DFF 139 generates a skip command (skip_vld). That is, when no B-picture is included in the input data, a skip command, ordering the abandonment of even the P-picture without decoding, is generated.

Also, when the current picture is a P-picture, and when the B-picture detection signal (low_delay) indicating that no B-picture is included in input data is "0", then if the output of the NOR gate (NOR), indicating that no B-picture is included, is "1", the output of the sixth AND gate (AND6) becomes "1", and so the output of the seventh AND gate (AND7) also becomes "1". Thus, the fourth DFF 139 generates a skip command (skip_vld). That is, when a current picture is a P-picture, and when the B-picture detection signal is "0", then if no B-picture is included in input data, a skip command (skip_vld) is generated to abandon even the P-picture, although the current picture is a P-picture.

Meanwhile, when the picture delay signal (pulse_pic_nd) is "1", if the comparison range (range_over) is "0", the output of the second AND gate (AND2) of FIG. 6 and that of the seventh AND gate (AND7) both become "0". Thus, the hold command (hold_vld) and the skip command (skip_vld) are both "0", so the variable-length decoder 12a of FIG. 2 performs normal decoding.

As described above, in the picture synchronization circuit and method according to the present invention, although decoding of a picture is early or late due to generation of an error in input data, a decoding time stamp value of a picture is compared with an STC count value, so the picture decoding is delayed or the picture is skipped without decoding according to the comparison results. Therefore, the correct time of output of the decoded picture is restored, thus providing a high quality image.

While only certain embodiments of the invention have been specifically described herein, it will apparent that numerous modifications may be made thereto without departing from the spirit and scope of the invention.

What is claimed is:

1. A picture synchronization circuit in a moving picture decoder for decoding an input picture, said circuit comprising:

first generating means for comparing a decoding time stamp (dts) value of an input picture with a system time clock (STC) count value at a moment of inputting said input picture, and generating a comparison signal;

second generating means for generating a first control signal, for delaying decoding of said input picture, according to said comparison signal; and third generating means for generating a second control signal, for skipping said picture without decoding said input picture, according to said comparison signal.

2. A picture synchronization circuit as claimed in claim 1, wherein said second generating means generates said first control signal, for delaying decoding of said input picture by a time corresponding to the difference between said dts value and said STC count value, when said dts value is greater than said STC count value, and the difference between said dts value and said STC count value is greater than a predetermined threshold value.

3. A picture synchronization circuit as claimed in claim 1, wherein said third generating means generates said second control signal, for skipping said input picture without decoding said input picture, when said dts value is smaller than said STC count value, and the difference between said dts value and said STC count value is greater than a predetermined threshold value.

4. A picture synchronization circuit as claimed in claim 1, wherein said third generating means generates said second control signal, for skipping a current picture if said current picture is a B-picture, when said dts value is smaller than said STC count value, and the difference between said dts value and said STC count value is greater than a predetermined threshold value.

5. A picture synchronization circuit as claimed in claim 1, wherein said third generating means generates said second control signal, for skipping a current picture that is an I-picture, if all pictures in a previous group of pictures were I-pictures, said dts value is smaller than said STC count value, and the difference between said dts value and said STC count value is greater than a predetermined threshold value.

6. A picture synchronization circuit as claimed in claim 1, wherein said third generating means generates said second control signal, for skipping a current picture if said current picture is a P-picture, according to a detection signal indicating that no B-picture is included in input data, when said dts value is smaller than said STC count value, and the difference between said dts value and said STC count value is greater than a predetermined threshold value.

7. A picture synchronization circuit as claimed in claim 1, wherein said third generating means generates said second control signal, for skipping a current picture that is a P-picture, if no B-picture is included in a previous group of pictures, even if a B-picture is included in input data, when said dts value is smaller than said STC count value, and the difference between said dts value and said STC count value is greater than a predetermined threshold value.

8. A picture synchronization circuit in a moving picture decoder that includes a variable-length decoder for decoding an input picture, said circuit comprising:

a subtraction circuit for subtracting an STC count value when said input picture is input, from a decoding time stamp value of said input picture applied by said variable-length decoder, and outputting a result of said subtraction;

a hold determination circuit for outputting a hold command, for delaying decoding of said input picture, to said variable-length decoder, according to the result of said subtraction; and a skip determination circuit for outputting a skip command, for skipping said input picture without decoding said input picture, to said variable-length decoder, according to the result of said subtraction.

9. A picture synchronization circuit as claimed in claim 8, wherein said subtraction circuit comprises:

a latch for latching the STC count value when the input picture is input to said variable-length decoder and starts being decoded;

a subtractor for subtracting the decoding time stamp value, applied by said variable-length decoder, from said latched STC count value;

an absolute value circuit for obtaining an absolute value of the result of said subtraction made by said subtractor;

a comparator for comparing said absolute value with a predetermined threshold value; and a delay for delaying a picture start signal output by said variable-length decoder until comparison results of said comparator are output, and for outputting a picture delay signal.

10. A picture synchronization circuit as claimed in claim 8, wherein said hold determination circuit generates a hold command until said STC count value becomes identical to said decoding time stamp value, when said decoding time stamp value is larger than said STC count value, and the result of said subtraction is larger than a predetermined threshold value.

11. A picture synchronization circuit as claimed in claim 8, wherein said skip determination circuit generates a skip command for skipping a current picture without decoding said current picture, when said decoding time stamp value is smaller than said STC count value, and the result of said subtraction is larger than a predetermined threshold value.

12. A picture synchronization circuit as claimed in claim 9, wherein said hold determination circuit comprises:

a detection circuit for detecting a rising edge of a clock signal formed by dividing a system clock by a predetermined number;

a first generating circuit for generating a hold start signal, when said decoding time stamp value is larger than said STC count value, the comparison result of said comparator is larger than a predetermined threshold value, and a picture delay signal is output by said delay;

a counting circuit for loading difference between said decoding time stamp value and said STC count value, and reducing the loaded difference value by one at every rising edge of said clock signal; and a second generating circuit for generating a hold command until an output of said counting circuit becomes "0", according to said hold start signal.

13. A picture synchronization circuit as claimed in claim 9, wherein said skip determination circuit comprises:

a latch circuit for latching types of previous pictures;

a comparing circuit for comparing a type of a current picture with the types of previous pictures, and generating a control signal for controlling skipping of said current picture; and a generating circuit for generating a skip command for ordering said variable-length decoder to abandon said current picture without decoding said current, according to said control signal, when said decoding time stamp value is smaller than said STC count value, a result of said comparator is larger than a predetermined threshold value, and the picture delay signal is output by said delay.

14. A picture synchronization circuit as claimed in claim 13, wherein said comparing circuit comprises:

a first comparator for comparing whether the current picture type is a B-picture;

second through fifth comparators for comparing whether a type of each of one picture-previous through four pictures-previous is an I-picture;

a first AND gate for performing an AND operation on the outputs of said second through fifth comparators;

a sixth comparator for comparing whether the current picture type is a P-picture;

seventh through tenth comparators for comparing whether the type of each of one picture-previous through four pictures-previous is a B-picture;

a NOR gate for performing an inverted-OR operation on the outputs of said seventh through tenth comparators;

a first OR gate for performing an OR operation on a detection signal that represents whether a B-picture is included in input data, and the output of said NOR gate;

a second AND gate for performing an AND operation on the output of said sixth comparator and the output of said first OR gate; and a second OR gate for generating said control signal by performing an OR operation on the outputs of said first comparator, said first AND gate, and said second AND gate, and outputting said control signal to said generating circuit.

15. A picture synchronization circuit as claimed in claim 14, wherein said generating circuit is comprised of a latch for generating a skip command according to the output of said second OR gate, when the decoding time stamp value is smaller than the STC count value, the comparison result of said comparator is larger than the predetermined threshold value, and the picture delay signal is output by said delay.

16. A picture synchronization circuit as claimed in claim 14, wherein said comparing circuit generates the control signal for controlling the skipping of the current picture, through said second OR gate, when said current picture is determined to be a B-picture by said first comparator.

17. A picture synchronization circuit as claimed in claim 14, wherein said comparing circuit generates said control signal for controlling the skipping of the current picture, through said second OR gate, when the output of said first AND gate becomes "1" when a previous group of pictures are all determined to be I-pictures by comparison results of said second through fifth comparators.

18. A picture synchronization circuit as claimed in claim 14, wherein said comparing circuit generates said control signal for controlling the skipping of a P-picture, which is the current picture, through said second OR gate, when the output of said second AND gate becomes "1" when the current picture is determined by said sixth comparator to be a P-picture, and said first OR gate receives the detection signal representing that no B-picture is included in input data and outputs "1".

19. A picture synchronization circuit as claimed in claim 14, wherein said comparing circuit generates said control signal for controlling the skipping of a P-picture which is the current picture, through said second OR gate, when the output of said second AND gate becomes "1", the current picture is a P-picture according to a comparison result of said sixth comparator, and no B-picture is included in a previous group of pictures according to comparison results of said seventh through tenth comparators output through said NOR gate.

20. A picture synchronization method in a method for decoding an input coded moving picture, said method comprising the steps of:
    (a) comparing a decoding time stamp value of an input picture with a system time clock count value at a moment said input picture is input;
    (b) delaying decoding of said input picture by a time corresponding to a difference between said decoding time stamp value and said system time clock count value, when said decoding time stamp value is larger than a system time clock count value, and the difference between said decoding time stamp value and said system time clock count value is larger than a predetermined threshold value; and
    (c) skipping said input picture without decoding said input picture when said decoding time stamp value is smaller than said system time clock count value, and the difference between said decoding time stamp value and said system time clock count value is larger than a predetermined threshold value.

21. A picture synchronization method as claimed in claim 20, wherein, when said decoding time stamp value is smaller than said system time clock count value, and when the difference between said decoding time stamp value and said system time clock count value is larger than said predetermined threshold value, a current picture is skipped if said current picture is a B-picture.

22. A picture synchronization method as claimed in claim 20, wherein when said decoding time stamp value is smaller than said system time clock count value and when the difference between said decoding time stamp value and said system time clock count value is larger than said predetermined threshold value, a current picture is skipped even if said current picture is an I-picture, if a previous group of pictures were I-pictures.

23. A picture synchronization method as claimed in claim 20, wherein when said decoding time stamp value is smaller than said system time clock count value and when the difference between said decoding time stamp value and said system time clock count value is larger than said predetermined threshold value, a current picture is skipped, even if said current picture is a P-picture, if no B-picture is included in input data.

24. A picture synchronization method in a method for decoding an input coded moving picture, said method comprising the steps of:
    (a) comparing a decoding time stamp value of an input picture with a system time clock count value at the moment said input picture is input; and
    (b) delaying decoding of said input picture by a time corresponding to a difference between said decoding time stamp value and said system time clock count value, when said decoding time stamp value is larger than said system time clock count value, and the difference between said decoding time stamp value and said system time clock count value is larger than a predetermined threshold value.

* * * * *